(12) United States Patent
Cheng

(10) Patent No.: US 6,433,091 B1
(45) Date of Patent: Aug. 13, 2002

(54) ADHESIVE COMPOSITION

(75) Inventor: Haitao Cheng, East Hampstead, NH (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/852,961

(22) Filed: May 10, 2001

(51) Int. Cl.$^7$ .................................................. C08F 8/00
(52) U.S. Cl. .......................... 525/191; 525/76; 525/78; 525/88; 525/194; 525/340; 525/445; 526/193; 156/327; 156/334; 156/338
(58) Field of Search ............................... 525/76, 78, 88, 525/191, 194, 340, 445; 526/193; 156/327, 334, 338

(56) References Cited

U.S. PATENT DOCUMENTS

| | | |
|---|---|---|
| 4,223,115 A | 9/1980 | Zalucha et al. |
| 4,536,546 A | 8/1985 | Briggs |
| 4,714,730 A | 12/1987 | Briggs et al. |
| 4,769,419 A | 9/1988 | Dawdy |
| 4,942,201 A | 7/1990 | Briggs et al. |
| 5,112,691 A | 5/1992 | Briggs et al. |
| 5,206,288 A | 4/1993 | Gosiewski et al. |
| 6,204,321 B1 * | 3/2001 | Lanoye .................... 427/383.1 |
| 6,218,465 B1 * | 4/2001 | Kobayashi et al. ......... 524/700 |

* cited by examiner

Primary Examiner—Samuel A. Acquah
(74) Attorney, Agent, or Firm—Pearne & Gordon LLP

(57) ABSTRACT

A methacrylate ester or acrylate ester two-part reactive adhesive composition including vinyl-terminated liquid rubber and polymeric elastomer. The vinyl-terminated liquid rubber is preferably methacrylate-terminated or acrylate-terminated polybutadiene; the polymeric elastomer is preferably polychloroprene, core shell polymer and/or block copolymer rubber.

19 Claims, 1 Drawing Sheet

ADHESIVE COMPOSITION

FIELD OF THE INVENTION

The present invention relates generally to adhesives and more particularly to acrylic adhesives with improved toughness, bond strength and resistance to moisture.

BACKGROUND OF THE INVENTION

As used herein, "acrylic adhesives" includes acrylate and methacrylate adhesives. Two-component, reactive acrylic adhesives are frequently used as structural adhesives in the transportation, automotive and general industrial markets. These adhesives offer structural bond strength, fast set time, and good resistance to temperature extremes. Acrylic adhesives, particularly methacrylate adhesives, are known in the art, which art is incorporated herein by reference; see for example U.S. Pat. Nos. 4,536,546; 4,714,730; 4,942,201; 4,769,419; 5,112,691; 5,206,288 and the patents cited therein, the contents of all of which are incorporated herein by reference.

In many applications, current acrylic adhesives lack sufficient toughness and/or bond strength. There is a need for reactive acrylic adhesives with improved toughness and bond strength. In addition, there is a need for such adhesives to have improved resistance to moisture.

SUMMARY OF THE INVENTION

The present invention provides an adhesive composition that includes about 10–90 weight percent ester monomer, about 2–85 weight percent polymeric elastomer, about 0.02–10 weight percent initiator, and about 1–80 weight percent vinyl-terminated liquid rubber. The ester monomer is selected from methacrylate ester monomers, acrylate ester monomers and mixtures thereof. The composition preferably contains about 0.1–5 weight percent phosphate ester. Preferably the initiator is in a peroxide paste which contains at least 5 weight percent organic peroxide and less than 18 weight percent water. A kit for providing a two-component reactive adhesive composition according to the invention is also provided.

DETAILED DESCRIPTION OF THE PREFERRED EMBODIMENTS OF THE INVENTION

Figure 1:
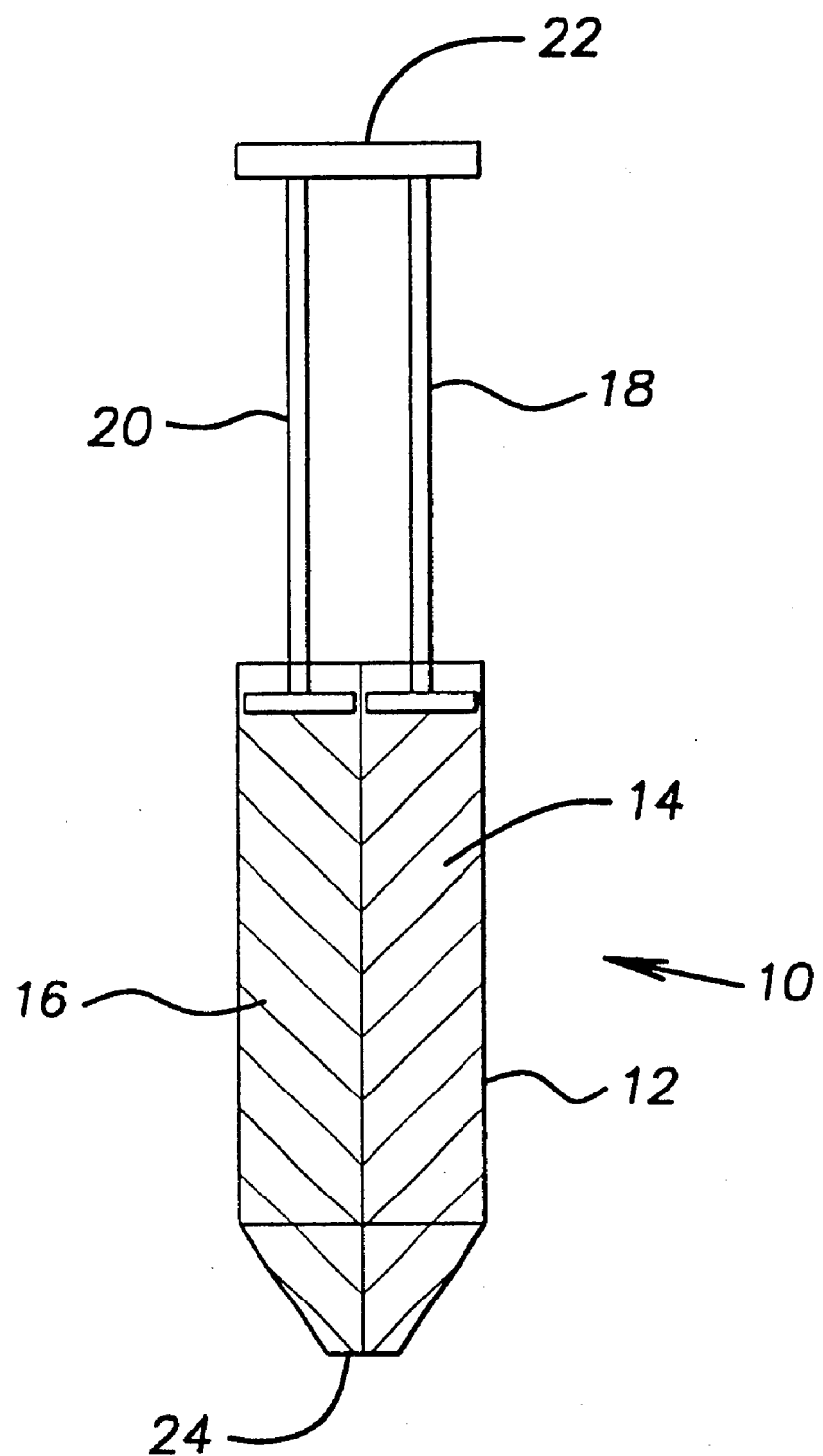
FIG. 1 is a schematic representation of a two-chamber applicator adapted to dispense a two-component reactive adhesive according to the present invention.

As used herein and in the claims, the following terms have the following meanings or definitions. Parts are parts by weight and percentages are weight percent unless otherwise indicated or apparent. Tensile lap shear means tensile lap shear as measured according to ASTM D1002. As used herein, when a preferred range such as 5–25 is given, this means preferably at least 5 and, separately and independently, preferably not more than 25.

The inventive adhesive composition (with Part A and Part B combined) has the following preferred formulation or table of components. In this formulation or table of components, any preferred or less preferred weight percent or weight percent range of any component can be combined with any preferred or less preferred weight percent or weight percent range of any of the other components; it is not required or necessary that all or any of the weight percents or weight percent ranges come from the same column.

Weight Percent

| Component | Preferred | More Preferred | Most Preferred |
|---|---|---|---|
| 1. Ester monomer | 40–80 | 54–64 | 59 |
|  | 30–84 | 52–66 |  |
|  | 20–87 | 50–70 |  |
|  | 10–90 | 45–75 |  |
| 2. Acid monomer | 1–13 | 4–7 | 5 |
|  | 0.5–15 | 3–9 |  |
|  | 0 | 2–11 |  |
| 3. Vinyl-terminated liquid rubber | 2–60 | 5–15 | 9 |
|  | 1–80 | 4–30 |  |
|  |  | 3–45 |  |
| 4. Polymeric elastomer | 7–70 | 19–30 | 25 |
|  | 4–80 | 16–40 |  |
|  | 2–85 | 13–50 |  |
|  |  | 10–60 |  |
| 5. Phosphate ester | 0.1–5 | 0.5–3 | 1 |
|  | 0 |  |  |
| 6. Inhibitor | 0.001–0.2 | 0.005–0.1 | 0.02 |
|  | 0 |  |  |
| 7. Scavenger | 0.002–2 | 0.01–0.8 | 0.4 |
|  | 0 |  |  |
| 8. Initiator (based on 100% peroxide) | 0.5–6 | 2–3 | 2.5 |
|  | 0.1–8 | 1–4 |  |
|  | 0.02–10 |  |  |
| 9. Activator | 0.1–5 | 0.5–2.5 | 1 |
|  | 0 |  |  |
| 10. Wax | 0.04–2 | 0.2–1 | 0.4 |
|  | 0 |  |  |

The ester monomer is preferably a methacrylate ester monomer, more preferably methacrylate ester monomers where the alcohol portion of the ester group contains 1–8 carbon atoms, more preferably 2-ethylhexyl methacrylate, hydroxyethyl methacrylate, cyclohexyl methacrylate, ethyl methacrylate, 1,3-butanedioldimethacrylate (BDMA) and butyl methacrylate, most preferably methyl methacrylate (MMA).

The ester monomer may also be an acrylate ester monomer, more preferably acrylate ester monomers where the alcohol portion of the ester group contains 1–8 carbon atoms, more preferably methyl acrylate, ethyl acrylate, butyl acrylate and 2-ethylhexyl acrylate. Mixtures of any of the foregoing ester monomers can be used.

The acid monomer, which is an optional component, is preferably free-radical polymerizable acid monomers known in the art, preferably ethylenically unsaturated mono or polycarboxylic acids, more preferably maleic acid and crotonic acid, and most preferably methacrylic acid (MAA) and acrylic acid.

The vinyl-terminated liquid rubber is preferably vinyl-terminated liquid rubbers known in the art (such as liquid polybutadienes and/or liquid polyisoprenes and copolymers thereof), more preferably polyether or polyester polyol and other oligomeric material with vinyl functional terminal groups that have a glass transition temperature below 0°C., more preferably methacrylate-terminated or acrylate-terminated polybutadiene-acrylonitrile copolymers such as Hycar VTBN, and most preferably methacrylate-terminated or acrylate-terminated polybutadiene such as Hycar VTB from BF Goodrich.

The polymeric elastomer is preferably chlorosulfonated polyethylene or chlorinated polyethylene, more preferably nitrile rubber particles or powder, all-acrylic copolymer resins or all-acrylic rubber particles, more preferably polymeric elastomers which are soluble in methacrylate/acrylate monomers, more preferably core shell polymers or block copolymer rubber, and most preferably polychloroprene, or mixtures of the foregoing.

The polychloroprene rubber is preferably neoprene, such as Neoprene AD-5, AD-10 or WRT, available from DuPont Dow Elastomers. The block copolymer rubber is preferably block copolymers of either butadiene or isoprene with styrene (for example, SBS, SIS, SEBS and SB) and are available from Shell Chemical Co. as Kraton D-1116 and other Kraton D-grade elastomers or Vector 2411IP from Dexco. PBu content is preferably 70–77%. Other elastomers with Tg below about 25° C., which are soluble in methacrylate/acrylate monomers, can be used in place of the polychloroprene and/or the block copolymer rubbers. Examples of such are homopolymer of epichlorohydrin and its copolymers with ethylene oxide, available from Zeon Chemicals as Hydrin, acrylate rubber pellets, available from Zeon as HyTemp, polyisoprene rubber, polybutadiene rubber, nitrile rubber, and SBR rubber (random copolymer of butadiene and styrene). If any of the above-mentioned elastomers is a liquid, its weight percent in the overall formulation can go up to 70 or 80 or 85%. As is known, the acrylic adhesive is made from a Part A and a Part B.

The core shell polymer is preferably a graft copolymer of the "core-shell" type. Preferred core shell polymers are acrylonitrile-butadiene-styrene (ABS), methacrylate-butadiene-styrene (MBS), and methacrylate-acrylonitrile-butadiene-styrene (MABS). Blendex 338 is an ABS powder from GE Plastics. Less preferred alternatives to the core shell polymer are all-acrylic copolymer resins such as Product Nos. KM330 and KM323B from Rohm and Haas. The preferred nitrile rubber powder is available from Goodyear as Chemigum P-83. Optionally, all-acrylic rubber particles, such as Sunigum, from Goodyear, can be used. Other resin fillers known in the art, which swell but do not dissolve in the monomer solution, can be used in place of nitrile rubber powder to provide paste-type consistency and further toughen the cured adhesive.

The phosphate ester is preferably functional phosphate esters, such as are described in U.S. Pat. Nos. 4,223,115 and 4,769,419, more preferably methacrylate phosphate esters, such as the phosphate ester of 2-hydroxyethyl methacrylate (preferably not more than 80% esterified), an example of which is commercially available as P-2M from Polymer Systems, Japan, or T-Mulz 1228 from Hacros Chemicals, Pennsylvania. The addition of phosphate ester improves primerless metal bonding by acting as an adhesion promoter.

The inhibitor is a free-radical polymerization inhibitor, which increases shelf life and prevents or inhibits premature polymerization and is preferably BHT or other known free-radical polymerization inhibitors, more preferably hydroquinone (HQ) or methylhydroquinone (MEHQ).

The scavenger (of metal ions) is preferably EDTA salt and other known scavengers or chelators.

The initiator is a free-radical initiator and is preferably free-radical initiators known in the art, more preferably a perester or peracid, most preferably an organic peroxide or organic hydroperoxide. Preferred initiators in the present invention are benzoyl peroxide (BPO), tert-butylperoxybenzoate (TBPB), cumene hydroperoxide (CHP), tertiary butyl hydroperoxide, dicumyl peroxide, and tertiary butyl peroxide acetate. A preferred initiator is Benox-50 (B-50) (from The Norac Company, Inc., Azusa, Calif.), a peroxide paste believed to contain 50% benzoyl peroxide, about 18% water and about 30% non-phthalate benzoate ester. More preferably, the initiator is Varox ASNS from R.T. Vanderbilt, Norwalk, Conn., a peroxide paste which is believed to contain 55% BPO, about 12% water and about 30% butyl phthalate plasticizer. Five grams of Benox-50 provides 2.5 g initiator based on 100% peroxide. Preferably, the initiator is provided in a paste (such as Benox-50 or Varox ANS), which contains at least 5, 10, 20, 30 or 40 weight percent BPO or other organic peroxide and preferably less than 18, 17, 16 or 14 weight percent water. It is believed that less water leads to (a) less voids at the adhesive/substrate interface and thus greater bond strength and (b) improved thermal stability at temperatures above 300° F.

An activator is preferably used to accelerate the rate of polymerization and is preferably tertiary aromatic amine, preferably dimethyl toluidine (DMT) and/or 2,2'-(p-tolylimino)diethanol (TMD), less preferably a tertiary amine or others known in the art.

The wax increases open time and is preferably honey bee wax or chlorinated wax or other waxes, more preferably Wax 1977 from IG International.

Optionally whitening agents such as $TiO_2$, $CaCO_3$ and $Al_2O_3$ may be added to the adhesive composition, and UV resistance agents such as Tinuvin 400 from Ciba-Geigy may be added. A polymeric resin which acts as a thixotropic agent and/or toughener, such as polyamide powder such as Disparlon 6200 from King Industries may be added. Antioxidants such as BHT may also be used. Other optional ingredients include pigments, dyes, reinforcing fibers, fillers, flame-retardant agents, etc. Other additives known in the art may also be used in conventional amounts.

As is known in the art, these acrylate ester and methacrylate ester monomer adhesives are two-part, reactive adhesives which are prepared in a Part A and a Part B, which are maintained separated in a Part A chamber and a Part B chamber. The chambers can be, for example, compartments or separate containers or barrels or pails. Parts A and B are combined at the time of use, when they react and form the final adhesive. As is known in the art, there is wide latitude in which ingredients are put in the Part A and which ingredients are put in the Part B. An important requirement is that the ingredients which will initiate the reaction be kept separate or apart from the materials they will react with. This can be seen in the Examples which follow. The typical division into Parts A and B is known in the art and as shown in the Examples herein. Typically 10 parts by weight of Part A are combined with 1 part by weight of Part B. Alternatively the ratio of A:B can be about 5:1, 3:1, 2:1, 1:1, 1:2, 1:3 or 1:5 or other ratios.

With reference to FIG. 1, there is shown an applicator or kit 10 having a barrel 12 which has a nozzle 24. The barrel 12 includes two separate chambers or compartments, a first chamber 14 containing Part A of an adhesive composition according to the present invention and a second chamber 16 containing a corresponding Part B of an adhesive composition according to the present invention. The applicator 10 also has a pair of plungers 18 and 20 joined by a dual plunger handle 22. When the handle 22 is pushed down, Part A and Part B are expelled from their respective chambers and join and mix together as they come out of the nozzle 24. They are then preferably further mixed together so they can fully react to form the final adhesive. Alternatively a kit can be provided comprising a 55 gallon drum or barrel or chamber of Part A and a 5.5 gallon pail or chamber of Part B, to be mixed in an A:B ratio of 10:1.

The invented adhesive is preferably used to bond metals, composites and/or plastic parts with no or minimal surface preparation, preferably in the transportation, automotive and general industrial markets. The adhesive is preferably used where high tensile, peel, impact strength and durability are required. It is believed that the combination of vinyl-terminated liquid rubber and polymeric elastomer in the invented adhesive gives enhanced performance in the areas of toughness and cold temperature impact. The cured invented adhesive preferably exhibits tensile lap shear (TLS) on steel (measured according to ASTM D1002) of at least 2300, more preferably at least 2500, more preferably at least 2900, more preferably at least 3300, psi.

The following Examples further illustrate various aspects of the invention. Unless otherwise indicated, the ingredients are combined and applied using methods known in the art.

Examples 1–13 are adhesives which were prepared. The parts by weight for each component is shown. As can be seen, these are methacrylate adhesive compositions. The VTB liquid rubber is Hycar VTB. Bentone 27 is silica filler. Epon 828 is an epoxy resin from Shell. Benzoflex is a non-phthalate plasticizer from Velsicol Chemical. Econopoly is a polyethylene powder filler. Easisperse 154 (blue) is a pigment. Polyol is polyethylene glycol which is a diluent. Minex 7 is a silica filler.

ally as the mixture was sheared with a Hochmeyer type high shear mixing blade until a uniform smooth paste was obtained. MAA, T-Mulz, DMT/TMD, other monomers were then added and mixed until the temperature reached 130° F. Molten Wax 1977 was then added while high speed mixing was maintained. Disparlon was added last to impart a thickening effect. The mixture was allowed to cool down to 90° F. and de-aired briefly under vacuum (20–25 in Hg) before discharging. In preparing Part B, all the ingredients were mixed with BPO paste until it became uniform. The processing temperature was kept below 90° F. to prevent any premature decomposition of BPO. The mixture was de-aired under vacuum before discharging.

EXAMPLES 1–6

(Parts by Weight)

|  | Ex. 1 | Ex. 2 | Ex. 3 | Ex. 4 | Ex. 5 | Ex. 6 |
|---|---|---|---|---|---|---|
| Part A |  |  |  |  |  |  |
| MMA | 67.23 | 63.73 | 61 | 64.22 | 66.32 | 60.38 |
| VTB Liquid Rubber | 0 | 5 | 9.92 | 7 | 0 | 0 |
| Kraton D1116 | 18.5 | 17 | 16.87 | 0 | 5 | 0 |
| Vector 2411P | 0 | 0 | 0 | 0 | 0 | 0 |
| Neoprene AD-5 | 0 | 0 | 0 | 21.1 | 21 | 24.51 |
| Neoprene AD-10 | 0 | 0 | 0 | 0 | 0 | 0 |
| MAA | 2 | 2 | 1.98 | 1.5 | 1.5 | 4.81 |
| P-2M(T-Mulz) | 1 | 1 | 1 | 0 | 0 | 0 |
| DMT | 0.5 | 0.5 | 0.5 | 0.96 | 0.96 | 0.97 |
| TMD | 0.5 | 0.5 | 0.5 | 0 | 0 | 0.5 |
| Blendex338 | 0 | 0 | 0 | 0 | 0 | 0 |
| Chemigum | 8 | 8 | 5.95 | 3.2 | 3.2 | 4.53 |
| EDTA salt | 0.04 | 0.04 | 0.04 | 0 | 0 | 0.02 |
| MEHQ | 0.04 | 0.04 | 0.04 | 0.02 | 0.02 | 0.02 |
| Wax1977 | 0.45 | 0.45 | 0.45 | 0 | 0 | 0 |
| Disparlon6200 | 1.74 | 1.74 | 1.74 | 2 | 2 | 1.47 |
| BDMA | 0 | 0 | 0 | 0 | 0 | 2.79 |
| Part B |  |  |  |  |  |  |
| B-50(50% BPO) | 10 | 10 | 10 | 10 | 10 | 10 |
| TLS on Steel(psi) | 1127 | 1350 | 1721 |  |  |  |
| TLS on Xenoy(psi) |  |  |  | 1840 | 1568 | 1500 |
| Peel on Xenoy(N/mm) |  |  |  | 9.6 |  | 3.7 |
| Impact (−30° C.) on Xenoy |  |  |  | bounced |  | substrate shattered |
| Fatigue Resistance (100–1000 psi, 5 Hz) on Xenoy |  |  |  | 8456 cycl. | 2154 cycl. | 1500 cycles |

In preparing Part A, VTB, Neoprene or Kraton or Vector, MEHQ and EDTA salt were dissolved in MMA to give a solution. Chemigum or Blendex 338 was then added gradu- Tensile lap shear (TLS) tests were performed based on ASTM D1002 for metals and ASTM D3163 on Xenoy. Peel Strength tests on Xenoy were based on ASTM D3807.

|  | Ex. 7 | Ex. 8 | Ex. 9 | Ex. 10 | Ex. 11 | Ex. 12 | Ex. 13 |
|---|---|---|---|---|---|---|---|
| Part A |  |  |  |  |  |  |  |
| MMA | 72.96 | 65.96 | 66.31 | 62.76 | 57.8 | 61.25 | 65.2 |
| VTB Liquid | 0 | 7 | 0 | 0 | 8.56 | 10.12 | 0 |

-continued

|  | Ex. 7 | Ex. 8 | Ex. 9 | Ex. 10 | Ex. 11 | Ex. 12 | Ex. 13 |
|---|---|---|---|---|---|---|---|
| Rubber |  |  |  |  |  |  |  |
| Kraton D1116 | 0 | 0 | 0 | 0 | 0 | 17.21 | 17.22 |
| Vector 2411P | 0 | 0 | 0 | 2.73 | 2.5 | 0 | 0 |
| Neoprene AD-5 | 17 | 17 | 23.74 | 0 | 0 | 0 | 0 |
| Neoprene AD-10 | 0 | 0 | 0 | 15.17 | 13.87 | 0 | 0 |
| MAA | 2 | 2 | 2 | 6.51 | 5.95 | 2.02 | 2.01 |
| P-2M(T-Mulz) | 1 | 1 | 1 | 1.09 | 1 | 0 | 0 |
| DTM | 1 | 1 | 1 | 1.91 | 1.75 | 0 | 0 |
| TMD | 0 | 0 | 0 | 0 | 0 | 1.01 | 1 |
| Blendex338 | 0 | 0 | 0 | 0 | 0 | 0 | 8.02 |
| Chemigum | 5 | 5 | 5 | 6.18 | 5.65 | 6.07 | 6.02 |
| EDTA Salt | 0.02 | 0.02 | 0.02 | 0.5 | 0.5 | 0.04 | 0.04 |
| MEHQ | 0.02 | 0.02 | 0.02 | 0.02 | 0.02 | 0.04 | 0.04 |
| Wax1977 | 0 | 0 | 0 | 0.4 | 0.4 | 0.46 | 0.45 |
| Disparlon6200 | 0.5 | 0.5 | 0.5 | 2.73 | 2 | 1.77 | 0 |
| BDMA | 0 | 0 | 0 | 0 | 0 | 0 | 0 |
| Bentone27 | 0.5 | 0.5 | 0.5 | 0 | 0 | 0 | 0 |
| Part B |  |  |  |  |  |  |  |
| B-50(50% BPO) | 0 | 0 | 0 | 0 | 0 | 8.96 | 8.96 |
| ANS(55% BPO) | 4.9 | 4.9 | 4.9 | 4.9 | 4.9 | 0 | 0 |
| Epon828 | 1.478 | 1.478 | 1.478 | 1.478 | 1.478 | 0 | 0 |
| Benzoflex | 1.5 | 1.5 | 1.5 | 1.5 | 1.5 | 0.68 | 0.68 |
| Econopoly | 2.1 | 2.1 | 2.1 | 2.1 | 2.1 | 0 | 0 |
| Easisperse 154(blue) | 0.022 | 0.022 | 0.022 | 0.022 | 0.022 | 0 | 0 |
| Chemigum | 0 | 0 | 0 | 0 | 0 | 0.12 | 0.12 |
| CHP | 0 | 0 | 0 | 0 | 0 | 0.07 | 0.07 |
| Polyol | 0 | 0 | 0 | 0 | 0 | 0.07 | 0.07 |
| Minex 7 | 0 | 0 | 0 | 0 | 0 | 0.1 | 0.1 |
| TLS on Steel(psi) | 3046(a) | 2918(a) | 3106(a) | 2832(c) | 3874(c) |  |  |
| TLS on Al(psi) | 3177(c) | 3726(c) | 3483(c) | 2829(c) | 3815(c) |  |  |
| Impact on Steel(−40° F.) | 7.7(a) | >29(c) | 22(c) | 13.8 | >22(c) |  |  |
| Impact on Al(−40° F.) | 8.5(c) | >24(c) | 16.5(a) | 19 | >26(c) |  |  |
| TLS on Xenoy(psi) |  |  |  |  |  | 2234(c) | 1198(a/c) |
| Peel on Xenoy (N/mm) |  |  |  |  |  | 6.5 | 2.1 |

Impact tests were performed on a GM certified Charpy Side Impact tester with kJ/m² as the unit.

(a) means adhesive failure; (c) means cohesive failure.

In Examples 1–3, it can be seen that, in combination with polymeric elastomer, as the amount of liquid rubber increases, the tensile lap shear on steel increases. Examples 4–6 show that, in combination with polymeric elastomer (here polychloroprene), adding liquid rubber improves tensile lap shear, peel, impact strength and fatigue resistance. Examples 7–9 show that the addition of liquid rubber to a system containing polymeric elastomer dramatically increases tensile lap shear on aluminum and impact strength on steel and aluminum at −40° F. Examples 10–11 show that tensile lap shear and impact strength are increased by the addition of liquid rubber to a system containing polymeric elastomer. Similar to Example 4, Examples 12–13 show that peel strength on Xenoy is increased dramatically by the addition of liquid rubber to a system containing polymeric elastomer (SBS block copolymer in Examples 12–13). An adhesive similar to Ex. 11 was prepared and tested and showed excellent moisture resistance (100% TLS retention on untreated aluminum) after immersion in tap water for 30 days. These results were surprising and unexpected.

Although the preferred embodiments of the invention have been shown and described, it should be understood that various modifications and changes may be resorted to without departing from the spirit and scope of the invention as disclosed and claimed herein.

What is claimed is:

1. An adhesive composition comprising about 10–90 weight percent ester monomer, about 2–85 weight percent polymeric elastomer, about 0.02–10 weight percent initiator, and about 1–80 weight percent vinyl-terminated liquid rubber, said ester monomer being selected from the group consisting of methacrylate ester monomers, acrylate ester monomers and mixtures thereof, said vinyl-terminated liquid rubber being selected from the group consisting of vinyl-terminated polybutadienes and copolymers thereof, vinyl-terminated polyisoprenes and copolymers thereof, and mixtures thereof.

2. An adhesive composition according to claim 1, wherein said ester monomer is selected from the group consisting of methacrylate ester monomers and mixtures thereof.

3. An adhesive composition according to claim 1, wherein said ester monomer is methyl methacrylate.

4. An adhesive composition according to claim 1, wherein said polymeric elastomer is selected from the group consisting of polychloroprene, core shell polymers, block copolymer rubbers and mixtures thereof.

5. An adhesive composition according to claim 1, wherein said vinyl-terminated liquid rubber is selected from the group consisting of methacrylate-terminated polybutadiene, acrylate-terminated polybutadiene, methacrylate-terminated polybutadiene-acrylonitrile copolymers, acrylate-terminated polybutadiene-acrylonitrile copolymers, and mixtures thereof.

6. An adhesive composition according to claim 1, wherein said vinyl-terminated liquid rubber is selected from the group consisting of methacrylate-terminated polybutadiene, acrylate-terminated polybutadiene and mixtures thereof.

7. An adhesive composition according to claim 1, further comprising about 0.5–15 weight percent free-radical polymerizable acid monomer.

8. An adhesive according to claim 4, wherein said polymeric elastomer is polychloroprene.

9. An adhesive according to claim 1, wherein said adhesive composition when cured exhibits tensile lap shear on steel of at least 2300 psi.

10. An adhesive composition comprising about 10–90 weight percent ester monomer, about 2–85 weight percent polymeric elastomer, about 0.02–10 weight percent initiator, about 0.1–5 weight percent phosphate ester, and about 1–80 weight percent vinyl-terminated liquid rubber, said ester monomer being selected from the group consisting of methacrylate ester monomers, acrylate ester monomers and mixtures thereof, said vinyl-terminated liquid rubber being selected from the group consisting of vinyl-terminated polybutadienes and copolymers thereof, vinyl-terminated polyisoprenes and copolymers thereof, and mixtures thereof.

11. An adhesive composition comprising about 10–90 weight percent ester monomer, about 2–85 weight percent polymeric elastomer, about 0.02–10 weight percent initiator, and about 1–80 weight percent vinyl-terminated liquid rubber, said ester monomer being selected from the group consisting of methacrylate ester monomers, acrylate ester monomers and mixtures thereof, said initiator being in a peroxide paste which contains at least 5 weight percent organic peroxide and less than 18 weight percent water.

12. A kit for providing a two-component reactive adhesive formulation, said kit comprising a Part A chamber and a Part B chamber, said Part A chamber containing a Part A composition, said Part B chamber containing a Part B composition which is reactable with said Part A composition, said Part A composition and said Part B composition being combinable in a preselected weight ratio to yield an adhesive composition comprising about 10–90 weight percent ester monomer, about 2–85 weight percent polymeric elastomer, about 0.02–10 weight percent initiator, and about 1–80 weight percent vinyl-terminated liquid rubber, said ester monomer being selected from the group consisting of methacrylate ester monomers, acrylate ester monomers and mixtures thereof, said vinyl-terminated liquid rubber being selected from the group consisting of vinyl-terminated polybutadienes and copolymers thereof, vinyl-terminated polyisoprenes and copolymers thereof, and mixtures thereof.

13. A kit according to claim 12, wherein said ester monomer is methyl methacrylate.

14. A kit according to claim 12, wherein said polymeric elastomer is selected from the group consisting of polychloroprene, core shell polymers, block copolymer rubbers and mixtures thereof.

15. A kit according to claim 12, wherein said vinyl-terminated liquid rubber is selected from the group consisting of methacrylate-terminated polybutadiene, acrylate-terminated polybutadiene, methacrylate-terminated polybutadiene-acrylonitrile copolymers, acrylate-terminated polybutadiene-acrylonitrile, copolymers, and mixtures thereof.

16. A kit according to claim 12, wherein said vinyl-terminated liquid rubber is selected from the group consisting of methacrylate-terminated polybutadiene, acrylate-terminated polybutadiene and mixtures thereof.

17. A kit according to claim 12, wherein said adhesive composition further comprises about 0.1–5 weight percent phosphate ester.

18. A kit according to claim 12, wherein said adhesive composition further comprises about 0.5–15 weight percent free-radical polymerizable acid monomer.

19. A kit according to claim 12, wherein each of said Part A chamber and said Part B chamber is selected from the group consisting of drums, barrels and pails.

* * * * *

UNITED STATES PATENT AND TRADEMARK OFFICE
CERTIFICATE OF CORRECTION

PATENT NO. : 6,433,091 B1
DATED : August 13, 2002
INVENTOR(S) : Cheng

It is certified that error appears in the above-identified patent and that said Letters Patent is hereby corrected as shown below:

<u>Column 3,</u>
Line 12, please delete "24111P" and insert therefor -- 2411P --.

<u>Column 4,</u>
Line 2, please delete "ASNS" and insert therefor -- ANS --.
Line 8, please delete "Benox-50or" and insert therefor -- Benox-50 or --.

<u>Column 6,</u>
Examples 1-6, please delete "2234(c)" and insert therefor -- 1234(c) --.

<u>Column 10,</u>
Line 19, please delete "polybutadiene-acrylonitrile," and insert therefor
-- polybutadiene-acrylonitrile --.

Signed and Sealed this

Twenty-eighth Day of January, 2003

JAMES E. ROGAN
*Director of the United States Patent and Trademark Office*